United States Patent [19]

Iwata et al.

[11] Patent Number: 5,069,926

[45] Date of Patent: Dec. 3, 1991

[54] METHOD FOR MODIFYING THE SURFACE OF A POLYMER ARTICLE

[75] Inventors: Hiroo Iwata, Suita; Yoshiyuki Miyaki, Yamato; Hiroaki Nakamura, Ebina, all of Japan

[73] Assignee: Tosoh Corporation, Shinnanyo, Japan

[21] Appl. No.: 602,672

[22] Filed: Oct. 24, 1990

[30] Foreign Application Priority Data

Oct. 24, 1989 [JP] Japan .................................. 1-275001
Dec. 25, 1989 [JP] Japan .................................. 1-332871

[51] Int. Cl.⁵ .............................................. B05D 3/06

[52] U.S. Cl. ........................................ 427/40; 427/38; 427/41; 427/337; 427/400

[58] Field of Search ................. 427/41, 39, 40, 38, 427/337, 400

Primary Examiner—Bernard Pianalto
Attorney, Agent, or Firm—Oblon, Spivak, McClelland, Maier & Neustadt

[57] ABSTRACT

A method for modifying the surface of a polymer article, which comprises applying to the polymer article a macromer having a radical polymerizable double bond, followed by treatment with non-polymerizable plasma.

7 Claims, No Drawings

METHOD FOR MODIFYING THE SURFACE OF A POLYMER ARTICLE

The present invention relates to a method for modifying the surface of a polymer article by means of plasma or ozone gas. The method of the present invention is particularly useful for the surface modification for imparting antithrombic properties to various plastic equipments used in the medical or biochemical fields, or for the improvement in the stain resistance of a porous separating membrane useful for e.g. the separation of oil and water.

Heretofore, as a method for modifying the surface properties of a polymer article, it is known to coat other polymer on the article and then insolubilize it (Japanese Examined Patent Publication No. 35415/1980 and Japanese Unexamined Patent Publications No. 68103/1986 and No. 14904/1987). However, by such a method, the substarate and the coated polymer are not connected by a covalent bond, and they are likely to be pealed from each other, and when the substrate is a finely porous membrane, pores are likely to be clogged.

Further, various studies have been made to employ plasma for the modification of the surface properties of polymers. The merit resides in that by the plasma treatment, only the surface properties can readily be changed without modifying the properties of the entire polymer article. For example, Japanese Unexamined Patent Publication No. 157437/1981 discloses a method which comprises impregnating a water-soluble polymer to a porous article made of a hydrophobic polymer, followed by plasma treatment to impart a hydrophilic nature. Further, Japanese Unexamined Patent Publication No. 43010/1984 discloses a method of a graft-polymerizing a hydrophilic unsaturated monomer to a hydrophobic polymer in the presence of plasma, and Japanese Unexamined Patent Publication No. 80443/1984 discloses a method of irradiating plasma to a hydrophobic polymer, followed by contacting with a hydrophilic unsaturated monomer for graft polymerization in the absence of plasma.

However, in these methods employing plasma, the plasma generating apparatus are expensive. Further, since the plasma treatment is conducted in a vacuumed system, a large scale apparatus is required for a large polymer article. In addition to the above, there are a radiation graft polymerization method, a photo graft polymerization method, a corona discharge treatment, an ultraviolet ray irradiation method and a treating method with chemical reagents (see e.g. "Modification of Polymer Surface" edited by Fumio Ide, published by Kindai Henshusha (1987)). It is also known to conduct the surface modification by contacting a reactive gas such as fluorine, chlorine or ozone. However, no method has been known wherein an organic compound is bonded to a polymer surface by ozone.

It is an object of the present invention to overcome the drawbacks of the conventional surface modification methods and to provide a method for more efficiently and effectively modifying the surface of the polymer article.

The essence of the present invention resides in that in the modification of the surface of a polymer article, plasma treatment or ozone gas treatment is conducted after coating a macromer or organic compound having a radical polymerizable double bond on the polymer article.

Now, the present invention will be described in detail with reference to the preferred embodiments.

The polymer article in the present invention includes films, sheets, tubes, porous membranes, various containers, fibers and various other molded products made of synthetic polymers or natural polymers. The synthetic polymers include various polymers for general purposes and engineering plastics, such as polyolefin polymers (such as polyethylene and polypropylene), polyethylene terephthalate, polyvinyl chloride, polystyrene, polyisoprene, polybutadiene, polyacrylonitrile, polysulfone, polyamide, plyimide, polyvinylidene fluoride, polytetrafluoroethylene and polyurethane. They may not only homopolymers but also block copolymers, random copolymers, alternate copolymers or graft copolymers. The natural polymers include natural rubber, cellulose and derivatives thereof.

The macromer to be used prior to the plasma treatment in the present invention is a polymer having at least one radical polymerizable double bond in the molecule. The molecular weight of such a macromer is preferably from 500 to $10^6$, more preferably from 1,000 to $10^5$. If the molecular weight is less than this range, the macromer tends to be evaporated during the plasma treatment. On the other hand, if the molecular weight is too large, it becomes difficult to uniformly modify the surface. Such a macromer includes, for example, polyethylene glycol monoacrylate, polyethylene glycol diacrylate, polyethylene glycol dimethacrylate and polystyrene monoacrylate.

The organic compound having a radical polymerizable double bond to be used prior to the contact with ozone gas in the present invention is the one which does not dissolve or swell the polymer article, such as a monomer having at least one vinyl group, a diene monomer or a polymer (macromer) having at least one radical polymerizable double bond in the molecule. The monomer having at least one vinyl group includes, for example, a mono substituted ethylene such as styrene, a styrene derivative (such as sodium styrene sulfonate), acrylic acid or an acrylate, a 1,1-di-substituted ethylene such as methacrylic acid, a methacrylate or a methacrylamide, and a 1,2-di-substituted ethylene such as vinylene carbonate, a fumarate or a maleimide derivative. The diene monomer includes, for example, butadiene and derivatives thereof. The macromonomer includes, for example, polyethylene glycol monoacrylate, polyethylene glycol diacrylate, polyethylene glycol dimethacrylate and polystyrene monoacrylate (usually having a molecular weight of from 400 to $10^6$).

By the irradiation with plasma or by the contact with ozone gas for a short period of time, such an organic compound having a radical polymerizable double bond reacts with active groups such as radicals formed on the surface of the polymer article as the substrate for graft reaction, and at the same time, the organic compound itself undergoes radical polymerization, whereby it is fixed to the layer surface by a covalent bond and efficiently bonds to the surface of the polymer article. To attach the organic compound having a radical polymerizable double bond to the polymer article, such an organic compound is contacted to the polymer article in a gaseous or liquid state, or such an organic compound is dissolved in water or in a volatile organic solvent, and the solution is coated on the polymer article, followed by evaporating the organic solvent. When an organic solvent is employed, the solvent is required not to dissolve or swell the polymer article. Further, it is preferred to employ a non-volatile organic compound such as macromer or an ionic monomer, as the organic compound. The concentration of the monomer dissolved in an organic solvent is suitable selected depending upon the particular purpose. Usually, however, the monomer concentration is from 0.01 to 5% by weight. Examples of the organic solvent include alcohols such as methanol, ethanol and propanol, ethers such as ethyl ether and dioxane, a halogen compound such as chloroform, 1,2-dichloroethane or carbon tetrachloride, a ketone such as acetone or methyl ethyl ketone, and a saturated hydrocarbon such as hexane, heptane or octane.

In a case where the organic compound is water-soluble, it can be coated in the form of an aqueous solution, followed by evaporating water. However, in a case where the polymer article is a highly hydrophobic substrate, the wettability is poor with such an aqueous solution, and the organic compound can not adequately be attached. In such a case, it is advisable to use a solvent of a mixed system comprising water and an organic solvent.

The plasma treatment in the present invention is conducted by exposing the polymer article having a macromer attached thereto to the plasma generated by activating a gas by a high frequency discharge such as glow discharge, arc discharge or corona discharge. Here, as the gas, a non polymerizable gas such as air, oxygen, nitrogen, neon, argon, Krypton, xenon, helium, hydrogen or ammonia is preferred.

For this treatment, the pressure of the gas is preferably from 0.001 to 10 torr, more preferably from 0.01 to 5 torr. If the pressure is higher than this range, the plasma tends to be unstable. On the other hand, if the pressure is lower than this range, effective plasma treatment can hardly be conducted.

Now, the procedure of the method for modifying the surface of the polymer article by plasma according to the present invention will be described. Firstly, a macromer solution is coated on a polymer article, and the solvent is evaporated. Then, the article is put in a reaction container for generating plasma. The reaction container is evacuated by a vacuum pump. Then, the above mentioned gas is introduced, and the pressure is adjusted to a prescribed level. Then, plasma is generated by glow discharge. The electric power effectively utilized for the surface treatment is at most 10 W and at least 0.01 W, preferably at most 1 W and at least 0.01 W, per $cm^2$ of the surface. The irradiation time with plasma is usually from 1 to 1,800 seconds, preferably from 1 to 600 seconds. In the polymer article thus obtained, the macromer is graft-polymerized at the surface, and thus the surface is modified.

The ozone gas treatment in the present invention is conducted by exposing a polymer article having the above mentioned organic compound having a radical polymerizable double bond attached thereto to ozone gas. For this treatment, the concentration of ozone is preferably from 0.1 to 30 volume%, more preferably from 1 to 15 volume%. If the concentration is lower than this range, effective surface modification by ozone can hardly be conducted. On the other hand, if the concentration is higher than this range, the cost for the reaction tends to be high, such being uneconomical.

Now, one embodiment of the procedure of the method for modifying the surface of the polymer article by ozone gas according to the present invention will be described. A solution of the above mentioned organic compound having a radical polymerizable double bond is coated on a polymer article, and then the solvent is evaporated. Then, the article is put in a container containing ozone gas. The contact time with the ozone gas is usually from 1 to 1,800 seconds, preferably from 5 to 600 seconds. The polymer article thus obtained has the monomer graft-polymerized at the surface, and thus the surface is modified.

Now, the present invention will be described in further detail with reference to Examples. In the Examples, the effects of surface modification were evaluated by the contact angle and an X-ray photo electric spectrometer (ESCA), and the contact angle of water was measured by means of the contact angle meter CA-P Model, manufactured by Kyowa Kagaku K.K.

EXAMPLE 1

Polyethylene glycol dimethacrylate (molecular weight: about 1,200) was dissolved in ethanol in a concentration of 0.5% by weight, and the solution was coated on a polyethylene film having a thickness of 50 μm, whereupon the ethanol was evaporated. This film was irradiated for 20 seconds with plasma generated by means of IB-3 Model Ion Coater, manufactured by Eiko Engineering in argon gas under a pressure of 0.1 torr at an output of 100 W. The electrode had a diameter of 25 cm, and the treated area of the film was 100 cmhu 2.

The initial contact angle of the polyethylene film with water was 98°, whereas the contact angle with water after the plasma treatment was 50°, thus indicating that the surface became hydrophilic. Further, the ratio in the number of oxygen atoms to carbon atoms on the film surface (O/C) was obtained by an electron spectometric chemical analysis (ESCA), whereby the ratio was substantially 0 prior to the plasma treatment, and it became 0.40 after the treatment, thus indicating that the grafting was effectively carried out.

EXAMPLE 2

Polyethylene glycol diacrylate (molecular weight: about 4,200) was dissolved in a 25 volume% isopropyl alcohol aqueous solution in a concentration of 0.2% by weight, and a polysulfone membrane for ultrafiltration (UF-3000 PS, manufactured by TOSOH CORPORATION) was immersed in this solution for one hour. Then, the solvent was evaporated. This membrane was irradiated for 30 seconds with plasma generated by the same apparatus as in Example 1 in argon gas under a pressure of 0.1 torr at an output of 100 W. The electrode had a diameter of 25 cm, and the treated area of the membrane was 100 $cm^2$.

The initial contact angle of the polysulfone membrane with water was 72°, whereas the contact angle with water after the plasma treatment was 55°, thus indicating that the surface became hydrophilic. Further, the ratio in the number of oxygen atoms to carbon atoms (O/C) and the ratio in the number of sulfur atoms to carbon atoms (S/C) at the membrane surface were obtained, whereby O/C was 0.168 and S/C was 0.037 with the non-treated membrane, and O/C was 0.357 and S/C was 0.018 after the plasma treatment, thus indicating that the grafting was effectively carried out. Further, using a 0.2 N phosphoric acid buffer solution (pH=6.8) containing 1% of bovine serum globulin, the inhibitory rate of the bovine serum globulin was measured by pressure filtration under 0.3 atm, whereby the inhibitory rate was 63% with the non-treated membrane, and it was 68% after the plasma treatment. Further, the membrane permeation rate of pure water was measured by pressure filtration under 0.3 atm, whereby the membrane permeation rate was 203 l/m²hr with the non-treated membrane, and it was 195 l/m²hr after the plasma treatment. Thus, the permeation performance of the membrane was not substantially changed by the plasma treatment.

Using an aqueous suspension containing 0.3% by weight of olive oil, a filtration test was conducted under a pressure a 0.3 atm, whereby no substantial permeation of water was observed with the non-treated membrane, whereas with the membrane after the plasma treatment, the permeation rate of water was substantially equal to that in the case of pure water. This indicates that by the plasma treatment, the membrane became hardly stainable with oil.

COMPARATIVE EXAMPLE 1

Plasma treatment of a polyethylene film was conducted in the same manner as in Example 1 except that in Example 1, the polyethylene glycol dimethacrylate was changed to polyethylene glycol (molecular weight: 1,000).

The contact angle of the obtained membrane with water was 75°, and the O/C value obtained by ESCA was as small as 0.2, thus indicating that the grafting was not effectively carried out.

COMPARATIVE EXAMPLE 2

Plasma treatment of a polysulfone membrane for ultrafiltration was conducted in the same manner as in Example 2 except that in Example 2, the polyethylene glycol diacrylate was changed to polyethylene glycol (molecular weight: 5,000).

The O/C value and S/C value at the membrane surface were measured by ESCA, whereby O/C was 0.168 and S/C was 0.037 with the non-treated membrane, and O/C was 0.275 and S/C was 0.028 after the plasma treatment, thus indicating that the polyethylene glycol was not so grafted as in the case of Example 2. Further, also in the filtration test using a 0.3% olive oil aqueous suspension, the permeation rate of water rapidly decreased, and no effects for modification of the membrane surface by grafting of the polyethylene glycol was observed.

EXAMPLE 3

Polyethylene glycol dimethacrylate (molecular weight: about 1,200) was dissolved in ethanol in a concentration of 0.5% by weight. This solution was coated on a polyethylene film having a thickness of 50 μm, and ethanol was evaporated. This film was left to stand for 40 seconds in oxygen containing 12 volume% of ozone. Then, it was thoroughly washed with water and dried.

The initial contact angle of the polyethylene film with water was 98°, whereas the contact angle with water after the ozone treatment was 52° thus indicating that the surface became hydrophlic. Further, the ratio in the number of oxygen atoms to carbon atoms (O/C) at the film surface was determined by electron spectrometric chemical analysis (ESCA), whereby the ratio was substantially 0 prior to the ozone treatment, but it became 0.40 after the treatment, thus indicating that the grafting was effectively carried out.

EXAMPLE 4

Polyethylene glycol diacrylate (molecular weight: about 4,200) was dissolved in a 25 volume% isopropyl alcohol aqueous solution in a concentration of 0.2% by weight. In this solution, a polysulfone membrane for ultrafiltration (UF-3000PS manufactured by TOSOH CORPORATION) was immersed for one hour, and then the solvent was evaporated. This membrane was left to stand for 40 seconds in oxygen containing 12 volume% of ozone in the same manner as in Example 3. Then, it was thoroughly washed with water and dried.

The initial contact angel of the polysulfone membrane with water was 72°, whereas the contact angle with water after the ozone treatment was 54°, thus indicating that the surface became hydrophilic. Further, the ratio in the number of oxygen atoms to carbon atoms (O/C) and the ratio in the number of sulfur atoms to carbon atoms (S/C) at the membrane surface were determined by ESCA, whereby O/C was 0.168, and S/C was 0.037 with the non-treated membrane, whereas O/C was 0.359 and S/C was 0.017 after the ozone treatment, thus indicating that grafting was effectively carried out.

Further, using a 0.2 N phosphoric acid buffer solution (pH=6.8) containing 1% of bovine serum globulin, the inhibitory rate of bovine serum globulin was measured by pressure filtration under 0.3 atm, whereby the inhibitory rate was 63% with the non-treated membrane, and it was 68% after the ozone treatment. Further, the membrane permeation rate of pure water was measured by pressure filtration under 0.3 atm, whereby the membrane permeation rate was 203 l/m²hr with the non-treated membrane, and it was 210 l/m²hr after the ozone treatment. Thus, the permeation performance of the membrane was not substantially changed by the ozone treatment.

Further, using an aqueous suspension containing 0.3% by weight of olive oil, a filtration test was conducted under a pressure of 0.3 atm, whereby no substantial permeation of water was observed with the non-treated membrane, whereas with the membrane after the ozone treatment, the permeation rate of water was substantially equal to that in the case of pure water. This indicates that by the ozone treatment, the membrane became hardly stainable with oil.

COMPARATIVE EXAMPLE 3

Ozone treatment of a polyethylene film was conducted in the same manner as in Example 3 except that in Example 3, the polyethylene glycol demethacrylate was changed to polyethylene glycol (molecular weight: 1,000).

The contact angle of the obtained membrane with water was 75°, and the O/C value obtained by ESCA was as small as 0.2, thus indicating that grafting was not effectively carried out.

COMPARATIVE EXAMPLE 4

Ozone treatment of a polysulfone membrane for ultrafiltration was conducted in the same manner as in Example 4 except that in Example 4, the polyethylene glycol diacrylate was changed to polyethylene glycol (molecular weight: 5,000).

The O/C value and the S/C value at the membrane surface were measured by by ESCA whereby O/C was 0.168 and S/C was 0.037 with the non-treated membrane, whereas after the ozone treatment, O/C was 0.270 and S/C was 0030, thus indicating that the polyethylene glycol was not so grafted as in the case of Example 4. Further, also in the filtration test using a 0.3% olive oil aqueous suspension, the permeation rate of water rapidly decreased, and no effect for the modification of the membrane surface by the graft bond of polyethylene glycol was observed.

COMPARATIVE EXAMPLE 5

In Example 4, in the polyethylene glycol diacrylate (molecular weight: about 4,200) solution, a polysulfone membrane for ultrafiltration (UF-3000PS manufactured by TOSOH CORPORATION) was immersed for one hour, and then the solvent was evaporated. Then, without conducting the ozone treatment, the filtration test was conducted using the 0.3% olive oil aqueous suspension. As a result, the permeation rate of water rapidly decreased, and no effect for the modification of the membrane surface by the graft bond of the polyethylene glycol, was observed.

As is evident from the foregoing description, the surface modification of a polymer article can effectively be conducted by the plasma treatment method of the present invention. The method of the present invention is useful for the improvement of the stain resistance of filtration membranes, for imparting hydrophilicity to the surface of various plastic containers, or for the improvement of the antithrombic properties.

We claim:

1. A method for modifying the surface of a polymer article, which comprises applying to the polymer article a macromer having a radical polymerizable double bond, followed by treatment with non-polymerizable plasma, wherein the macromer is an organic compound having a molecular weight of from 500 to $10^6$, whereby the organic compound reacts with radicals formed on the surface of the polymer article for graft reaction and is fixed to the surface of the polymer article by a covalent bond.

2. A method for modifying the surface of a polymer article, which comprises applying to the polymer article an organic compound having a radical polymerizable double bond, and contacting ozone gas thereto, whereby the organic compound reacts with radicals formed on the surface of the polymer article for graft reaction and is fixed to the surface of the polymer article by a covalent bond.

3. The method for modifying the surface of a polymer article according to claim 1, wherein the macromer is a polymer having a molecular weight of from 1000 to $10^5$.

4. The method for modifying the surface of a polymer article according to claim 1, wherein the macromer is polyethylene glycol monoacrylate, polyethylene glycol diacrylate, polyethylene glycol dimethacrylate or polystyrene monoacrylate.

5. The method for modifying the surface of a polymer article according to claim 1, wherein the nonpolymerizable plasma is a plasma of a non-polymerizable gas selected from the group consisting of air, oxygen, nitrogen, neon, argon, Krypton, xenon, helium, hydrogen and ammonia.

6. The method for modifying the surface of a polymer article according to claim 2 wherein the organic compound is a monomer having at least one vinyl group, a diene monomer or a macromer having at least one radical polymerizable double bond in the molecule.

7. The method for modifying the surface of a polymer article according to claim 2, wherein the concentration of ozone in the ozone gas is from 0.1 to 30 volume%.

* * * * *